Sept. 30, 1969     D. DEWAR     3,469,662
VEHICLE ANTI-SKID BRAKING SYSTEMS
Filed Jan. 17, 1967     4 Sheets-Sheet 1

United States Patent Office 3,469,662
Patented Sept. 30, 1969

3,469,662
VEHICLE ANTI-SKID BRAKING SYSTEMS
Douglas Dewar, Rugby, England, assignor to The Dunlop Company Limited, London, England, a corporation of Great Britain
Filed Jan. 17, 1967, Ser. No. 609,823
Claims priority, application Great Britain, Jan. 21, 1966, 2,790/66
Int. Cl. B60t *8/12, 8/02;* G01r *11/00*
U.S. Cl. 188—181                              4 Claims

ABSTRACT OF THE DISCLOSURE

An electrical speed-sensing device for a vehicle, normally intended to form part of an anti-skid system, comprising a rotatable member of the vehicle drivably associated with a wheel of the vehicle and having an interrupted surface. An inductive transducer is mounted adjacent the rotatable member so that the passage of the interrupted surface past the transducer produces an alternating electrical signal proportional to wheel speed.

---

This invention relates to speed-sensing devices, particularly for vehicle anti-skid braking systems.

The object of the present invention is to provide an electrical speed sensing device for a vehicle anti-skid braking system.

According to the invention the electrical speed-sensing device for an anti skid braking system of a vehicle comprises a rotatable drive transmission or braking member of the vehicle and an associated inductive transducer, the member being of ferromagnetic material and having a series of interruptions in its surface, the interruptions being disposed around the axis of rotation of the member and arranged to pass during rotation of the member successively adjacent the transducer to cause a periodic fluctuation in the electromagnetic reluctance thereof, and means associated with the transducer to sense the frequency of a signal generated thereby as a result of the said periodic fluctuation.

The rotatable drive transmission member of the vehicle may be, for example, a road wheel, a differential gear or a propellor shaft coupling, and the rotatable braking member may be a braking disc of a disc brake, or a brake drum of a drum brake.

According to the invention also, the vehicle anti-skid braking system comprises a rotatable drive transmission or braking member of the vehicle and an associated inductive transducer, the member being of ferromagnetic material and having a series of interruptions in its surface, the interruptions being disposed around the axis of rotation of the member and arranged to pass during rotation of the member successively adjacent the transducer to cause a periodic fluctuation in the electromagnetic reluctance thereof, and means associated with the transducer to sense the rate of deceleration of the said member and to effect release of an associated wheel brake whenever the rate of deceleration exceeds a predetermined value.

A number of embodiments of the invention will now be described, by way of example, with reference to the accompanying drawings, in which.

Figure 1:
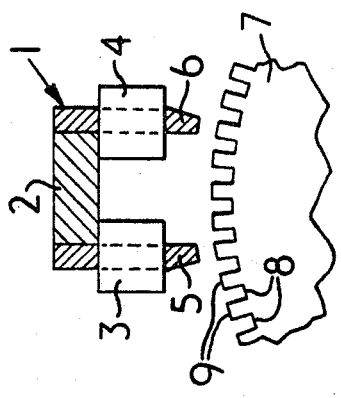
FIGURE 1 is a diagrammatic cross-sectional view, as seen in the axial direction, of part of a vehicle drive transmission or braking member and an associated transducer.

In the following examples, the inductive transducer, e.g. 1 (see FIGURE 1) is in the form of a permanent magnet core around which solenoid coils 3 and 4 are wound, the core having a pair of pole pieces 5 and 6. The transducer 1 is arranged to be mounted adjacent the interrupted surface of a rotatable member 7 which may comprise indentations 8 and teeth 9 as shown in FIGURE 1. The interruptions in the rotatable member may be in the form of projections or indentations or perforations. In the case of interruptions in the form of projections the reluctance of the transducer is lowered as each projection moves to a position adjacent the pole pieces and thus improves the magnetic circuit through the core and the member, and in the case of interruptions in the form of indentations or perforations the reluctance of the transducer is increased as each of the indentations or perforations moves to a position adjacent the pole pieces.

Rotation of the member 7 adjacent the pole pieces 5 and 6 of the transducer affects the magnetic circuit through the transducer, the reluctance of the magnetic circuit through the member 7 varying periodically as the indentations or interruptions 8 in the surface of the rotatable member pass adjacent to the pole pieces, setting up a corresponding alternating current in the coils 3 and 4.

Figure 2:
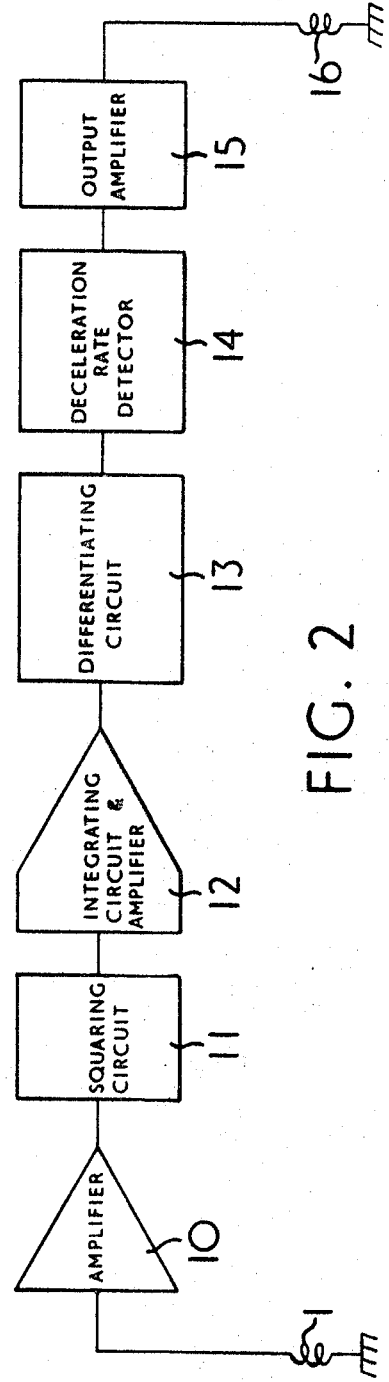
FIGURE 2 is a block diagram of an electrical circuit associated with the transducer shown in FIGURE 1.

The transducer is connected in an electrical circuit illustrated in FIGURE 2 which includes an amplifier 10 which produces an output signal varying periodically in amplitude at the frequency of the fluctuations in the reluctance of the magnetic circuit between the transducer 1 and the member 7. The alternating current output from the amplifier 10 is fed to a squaring circuit 11, followed by an integrating circuit and amplifier 12 which produces a unidirectional voltage output proportional to the frequency of the input signal from the transducer and therefore proportional to the rotational speed of the rotatable member 7.

The output from the integrating circuit and amplifier 12 is fed to a differentiating circuit 13 which produces an output signal proportional to the rate of deceleration of the member 7. This last described output signal is then fed to a further circuit 14 which constitutes a deceleration rate detector and provides an output signal to an amplifier 15 whenever the rate of deceleration rises above a predetermined level as a result of a wheel drivably associated with the rotatable member 7 tending to lock and skid. The amplifier 15 is arranged to operate a solenoid-controlled valve 16 to release the brake associated with the wheel whenever this occurs, thus checking the tendency to skid.

Figures 3, 4:
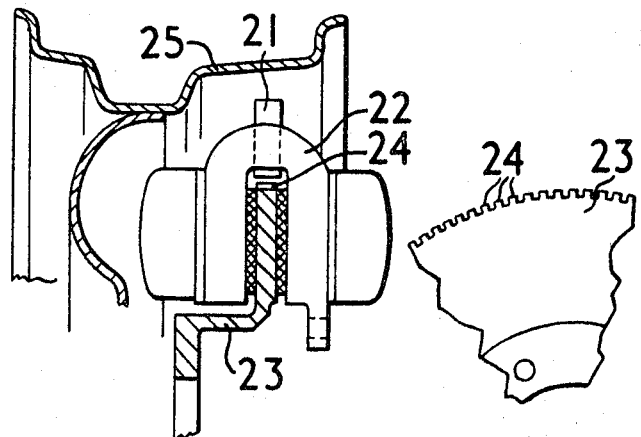
FIGURE 3 is a diagrammatic axial cross-sectional view of a disc brake incorporating a transducer, together with part of an associated wheel.
FIGURE 4 is a fragmentary view in the axial direction showing part of the brake disc of the brake shown in FIGURE 3.

In one practical embodiment shown in FIGURES 3 and 4 a transducer 21 is mounted in the bridging portion of a nonrotatable disc brake caliper 22 adjacent the outer periphery of a brake disc 23. The pole pieces of the transducer 21 are positioned closely adjacent the outer periphery of the disc 23, which is formed with a series of evenly spaced square-cut teeth 24 extending around the whole periphery of the disc. This arrangement has an advantage in that since a brake disc can be mounted so that there is very little eccentricity or radial run-out at the outer edge of the disc, the transducer can be positioned very close to the edge of the disc and will provide a signal in the electrical circuit of large amplitude as the teeth 24 pass adjacent the pole pieces and cause a periodic fluctuation in the reluctance of the transducer. An associated wheel 25 is shown in FIGURE 3; the speed and rate of deceleration of the wheel 25 is sensed by the transducer and a circuit as shown in FIGURE 2, and the fluid pressure supply to the brake is controlled by the electrical circuit output in known manner to effect release of the brake whenever the wheel tends to skid at the predetermined deceleration rate.

Figures 5, 6:
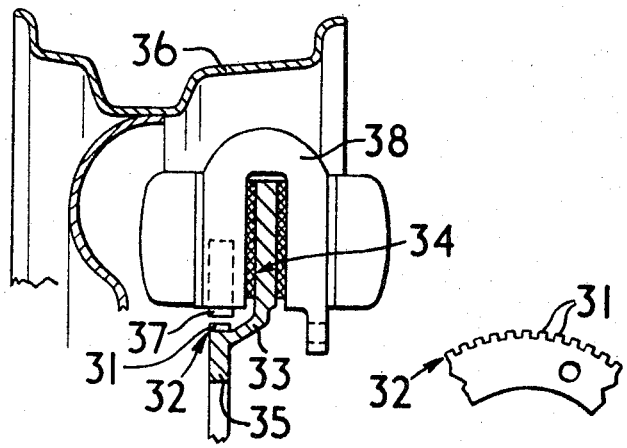
FIGURE 5 is a diagrammatic axial cross-sectional view of an alternative disc brake and transducer, together with part of an associated wheel.
FIGURE 6 is a fragmentary view in the axial direction showing part of the brake disc of the brake shown in FIGURE 5.

In an alternative construction shown in FIGURES 5 and 6 teeth 31 are formed on a radially outwardly projecting annular lip 32 positioned along the line of intersection between the axially extending portion 33 of a dished brake disc 34 and its radially inwardly extending flange 35 by which it is bolted to a hub associated with a wheel 36. In this arrangement, a transducer 37 is mounted on the brake caliper 38 in a position closely adjacent the annular lip 32.

Figure 7:
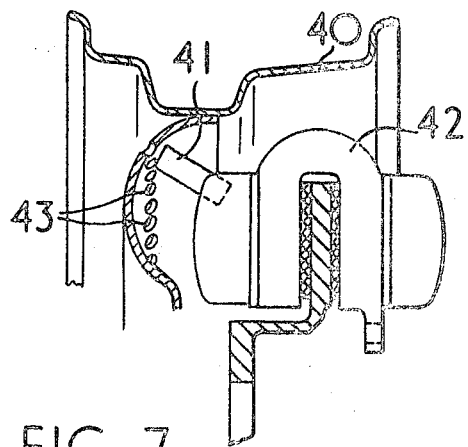

In a further alternative arrangement, shown in FIGURE 7, in which a road wheel 40 constitutes the rotatable drive transmission member, a transducer 41 is again mounted on a disc brake caliper 42 and projects axially outwardly so that its pole pieces are positioned closely adjacent a portion of the wheel body. The wheel body is perforated along a circle coaxial with the wheel and aligned with the pole pieces, the perforations 43 constituting interruptions in the surface of the wheel which, as they pass adjacent the pole pieces of the transducer 41, cause fluctuations in its electromagnetic reluctance.

Figure 8:
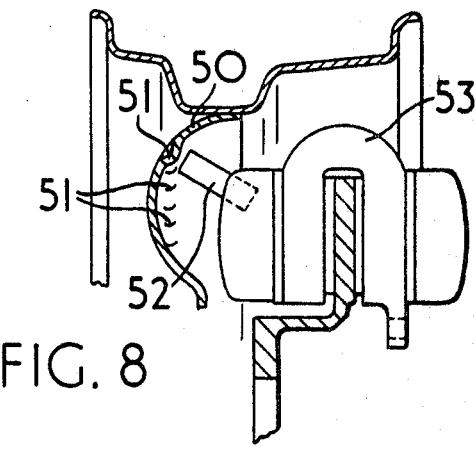

FIGURE 8 shows an alternative means for providing an interrupted surface on a wheel body 50 by forming a series of indentations or dimples 51 in the material of the wheel body to constitute projections which, as they pass adjacent the pole pieces of a transducer 52 mounted on a brake caliper 53, cause a decrease in its electromagnetic reluctance.

Figure 9:
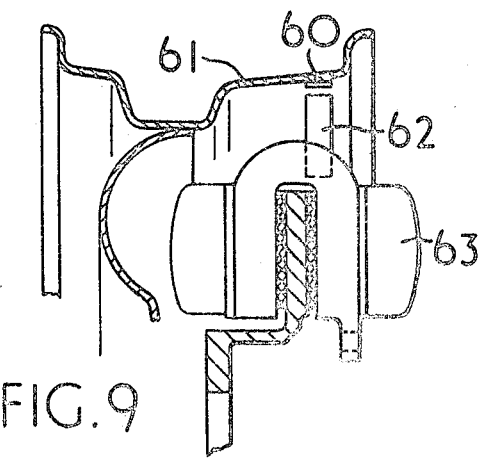
FIGURES 7–9 are diagrammatic axial cross-sectional views showing various arrangements in which a transducer is mounted on a disc brake caliper and is arranged to be actuated by a series of interruptions formed on the surface of an associated wheel.

In a third embodiment in which the interruptions are formed on a wheel, as illustrated in FIGURE 9, a strip of corrugated metal 60 is secured to the radially inner surface of a wheel rim 61, and a transducer 62 is mounted on a disc brake caliper 63 in a position adjacent the corrugated strip 60. The corrugated strip extends circumferentially around the whole inner peripheral surface of the rim and rotation of the wheel causes fluctuations in the electromagnetic reluctance of the transducer in a manner similar to the operation of the previously described embodiments.

Figure 10:
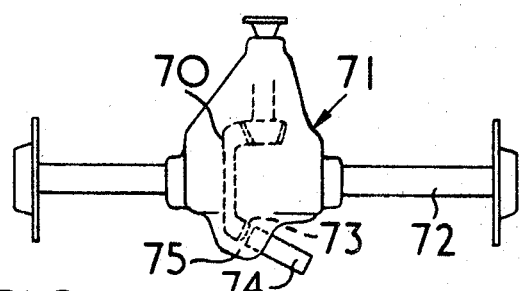
FIGURE 10 is a diagrammatic plan view showing in outline a vehicle rear axle and differential gear housing in which a transducer is incorporated.

FIGURE 10 shows one example of a way in which a component of the vehicle transmission, such as the crown wheel 70 of a differential gear 71 associated with a rear axle 72 of a vehicle can be used to provide an interrupted surface. In this case the gaps between adjacent teeth 73 on the crown wheel constitute interruptions and a transducer 74 is mounted in the differential housing 75 with its pole pieces closely adjacent the teeth on the crown wheel 70.

Figure 11:
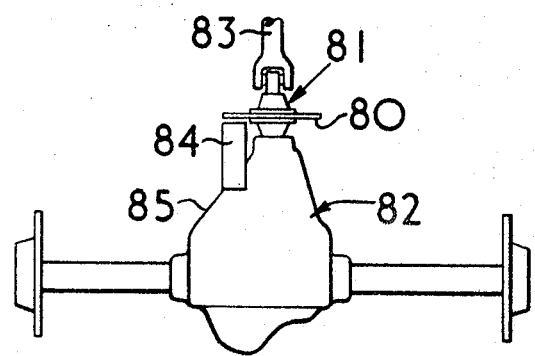
FIGURE 11 is a similar view to FIGURE 10 showing an alternative arrangement for the transducer.

In a further alternative system, shown in FIGURE 11, in which a speed signal is taken from the vehicle transmission, a ferromagnetic disc 80 is rotatably mounted to form part of the coupling 81 between the differential gear 82 and the propellor shaft 83, a transducer 84 being mounted adjacent the disc on the differential housing 85.

The disc 80 may be provided with holes, dimples, or teeth as in the embodiments described above.

Although the present invention has been illustrated and described in connection with certain selected example embodiments, it will be understood that these are illustrative of the invention and are by no means restrictive thereof. It is reasonably to be expected that those skilled in the art can make numerous revisions and adaptations of the invention, and it is intended that such revisions and adaptations will be included within the scope of the following claims as equivalents thereof.

Having now described my invention what I claim is:

1. An electrical speed-sensing device for an anti-skid braking system for disc brakes having axially applied braking members and comprising a brake disc having a series of regularly disposed interruptions, and comprised of ferromagnetic material disposed around a circumferential surface of said disc, an associated inductive transducer arranged so that the interruptions constructed in said disc pass during rotation of the disc successively adjacent the transducer to cause a periodic fluctuation in the electromagnetic reluctance thereof, and means associated with the transducer to sense the frequency of a signal generated thereby as a result of the said periodic flucauations to effect an output signal related to deceleration rates produced by braking operation, and means responsive to the output signal of said last mentioned means to control braking.

2. A device in accordance with claim 1 wherein the interruptions comprise indentations formed in the outer periphery of said disc.

3. A device in accordance with claim 1 including a brake caliper and wherein said transducer is mounted adjacent the disc on said nonrotatable brake caliper.

4. An electrical speed-sensing device for an anti-skid braking system comprising a brake disc having a series of regularly disposed interruptions formed in ferromagnetic material and disposed around a circumferential surface of said disc, an associated inductive transducer arranged so that the interruptions pass during rotation of the disc successively adjacent the transducer to cause a periodic fluctuation in the electromagnetic reluctance thereof, and means associated with the transducer to sense the frequency of a signal generated thereby as a result of the said periodic fluctuation to effect an output signal related to deceleration rates produced by braking operation, and means responsive to the output signal of said last mentioned means to control braking, said brake disc being of dished shape and includes an annular brake disc portion, an axially extending portion and a radially-inwardly-extending flange by which the disc is secured to a wheel hub, a radially-outwardly projecting annular lip formed along the line of intersection of the axially extending portion and the radially-inwardly-extending flange and indentations formed in the lip to provide the series of interruptions.

References Cited

UNITED STATES PATENTS

| | | |
|---|---|---|
| 2,669,669 | 2/1954 | Spaulding. |
| 2,913,662 | 11/1959 | Hogan. |
| 3,116,807 | 1/1964 | Wilson. |
| 3,158,033 | 11/1964 | Cohen. |
| 3,193,057 | 7/1965 | Rudqvist et al. |
| 3,233,946 | 2/1966 | Lockhart. |

DUANE A. REGER, Primary Examiner

U.S. Cl. X.R.

303—21; 324—70